United States Patent
Wang et al.

(10) Patent No.: US 9,171,196 B2
(45) Date of Patent: Oct. 27, 2015

(54) MULTI-BAND INFRARED CAMERA SYSTEM OPTIMIZED FOR SKIN DETECTION

(75) Inventors: Yao Rong Wang, Webster, NY (US); Lalit Keshav Mestha, Fairport, NY (US); Beilei Xu, Penfield, NY (US); Raja Bala, Pittsford, NY (US); Graham Pennington, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 894 days.

(21) Appl. No.: 13/416,436

(22) Filed: Mar. 9, 2012

(65) Prior Publication Data

US 2013/0235178 A1    Sep. 12, 2013

(51) Int. Cl.
| | | |
|---|---|---|
| *H04N 7/18* | (2006.01) | |
| *G06K 9/00* | (2006.01) | |
| *H04N 5/33* | (2006.01) | |
| *G06K 9/20* | (2006.01) | |

(52) U.S. Cl.
CPC ........ *G06K 9/00255* (2013.01); *G06K 9/00838* (2013.01); *G06K 9/2018* (2013.01); *H04N 5/33* (2013.01)

(58) Field of Classification Search
None
See application file for complete search history.

(56) References Cited

U.S. PATENT DOCUMENTS

| 7,355,714 B2 | 4/2008 | Wang et al. | |
|---|---|---|---|
| 7,385,704 B2 | 6/2008 | Mestha et al. | |
| 7,417,746 B2 | 8/2008 | Lin et al. | |
| 7,469,060 B2 * | 12/2008 | Bazakos et al. | 382/173 |
| 2011/0242328 A1 * | 10/2011 | Twede et al. | 348/164 |
| 2013/0300850 A1 * | 11/2013 | Millikan | 348/77 |

OTHER PUBLICATIONS

Mestha et al., "A Multi-Filter Array for a Multi-Resolution Multi-Spectral Camera", U.S. Appl. No. 13/239,642, filed Sep. 22, 2011.
Wang et al., "Determining a Number of Objects in an IR Image", U.S. Appl. No. 13/086,006, filed Apr. 13, 2011.
Wang, et al., "Determining a Total Number Of People in an IR Image Obtained Via an IR Imaging System", U.S. Appl. No. 12/96,775 filed Dec. 14, 2010.
Wang et al., "Determining a Pixel Classification Threshold for Vehicle Occupancy Detection", U.S. Appl. No. 13/324,308, filed Dec. 13, 2011.
Mestha et al., "Method for Classifying a Pixel of a Hyperspectral Image in a Remote Sensing Application", U.S. Appl. No. 13/023,310, filed Feb. 8, 2011.

* cited by examiner

*Primary Examiner* — Heather Jones
(74) *Attorney, Agent, or Firm* — Philip E. Blair; Fleit Gibbons Gutman Bongini & Bianco P.L.

(57) ABSTRACT

What is disclosed is a system and method for selecting the optimal wavelength ban combination for a multi-band infrared camera system which is optimized for skin detection. An objective function is constructed specifically for this application from classified performance and the algorithm generates wavelengths by maximizing the objective function. A specific wavelength band combination is selected which maximizes the objective function. Also disclosed is a 3-band and 4-band camera system with filters each having a transmittance of one of a combination of wavelength bands optimized to detect skin in the infrared band. The camera systems disclosed herein find their intended uses in a wide array of vehicle occupancy detection systems and applications. Various embodiments are disclosed.

16 Claims, 5 Drawing Sheets

MULTI-BAND INFRARED CAMERA SYSTEM OPTIMIZED FOR SKIN DETECTION

TECHNICAL FIELD

The present invention is directed to a method for determining an optimal wavelength band combination for filters of an infrared camera used for acquiring infrared images containing skin tissue, and an infrared camera with filters selected using the optimization method.

BACKGROUND

Skin detection using a multi-band near-infrared (NIR) camera and its application to face recognition and human occupancy detection in a vehicle is well documented. As shown in FIG. 5, the characteristic of human reflectance in the NIR range includes a drop from 1000 nm to 1450 nm, a small rise to 1650 nm, a drop to 1900 nm, and then remains relatively constant for a range of wavelengths. As such, the full extraction of skin reflectances in the image requires many wavelength bands. Simply adding an increased number of wavelength bands to the camera increases the cost of the imaging system.

Accordingly, what is needed is an infrared camera system designed to maximize the detection of skin in infrared images acquired over 3 or 4 filter bands thereby enabling a cost-effective solution to vehicle occupancy detection systems and applications.

INCORPORATED REFERENCES

The following U.S. patents, U.S. patent applications, and Publications are incorporated herein in their entirety by reference.

"A Multi-Filter Array For A Multi-Resolution Multi-Spectral Camera", U.S. Pat. No. 8,600,227, which discloses a multi-filter array for a multi-resolution and multi-spectral camera system for simultaneous spectral decomposition with a spatially and spectrally optimized multi-filter array suitable for image object identification.

"Determining A Number Of Objects In An IR Image", U.S. Pat No. 8,587,657, which discloses a correlation method and a best fitting reflectance method for classifying pixels in an IR image.

"Determining A Total Number Of People In An IR Image Obtained Via An IR Imaging System", U.S. Pat. No. 8,520,074, which discloses a ratio method for classifying pixels in an IR image.

"Determining A Pixel Classification Threshold For Vehicle Occupancy Detection", U.S. patent application Ser. No. 13/324,308, by Wang et al., which discloses a method for determining a threshold used for pixel classification.

"Method For Classifying A Pixel Of A Hyperspectral Image In A Remote Sensing Application", U.S. Pat. No. 9,019,358, which discloses a system and method for simultaneous spectral decomposition suitable for image object identification and categorization for scenes and objects under analysis.

"Reconfigurable MEMS Fabry-Perot Tunable Matrix Filter Systems And Methods", U.S. Pat. No. 7,355,714, to Wang et al.

"Two-Dimensional Spectral Cameras And Methods For Capturing Spectral Information Using Two-Dimensional Spectral Cameras", U.S. Pat. No. 7,385,704, to Mestha et al.

"Fabry-Perot Tunable Filter Systems And Methods", U.S. Pat. No. 7,417,746, to Lin et al.

BRIEF SUMMARY

What is disclosed is a system and method for selecting the optimal wavelength band combination for a multi-band infrared camera which is optimized for skin detection. An objective function is disclosed for this application. A specific wavelength band combination is selected which maximizes the objective function. Also disclosed is a 3-band and 4-band IR camera with filters each having a transmittance in one of the wavelength bands selected according to the optimization method disclosed herein. The IR camera systems disclosed herein find their uses in a wide array of vehicle occupancy detection systems, skin detection and facial recognition applications.

In one embodiment, a method is disclosed for determining a combination of bands for filters for an infrared camera used for skin detection. The method involves receiving at least one infrared image containing, at least in part, an area of exposed skin along with other objects. The pixels in the image are labeled as belonging to skin versus non-skin objects and split into a training set and a test set. A filter band combination is selected for evaluation. A pixel classification algorithm (a "classifier") is derived from the training data for the given set of filter bands. This classifier is used to classify each pixel in the test set as belonging to skin or non-skin objects. An objective function is calculated that measures the performance of this classifier on the test data for this filter band combination. The process is repeated for different filter band combinations and the results stored. A filter band combination is selected which maximized the objective function.

What is also disclosed is an infrared camera optimized for skin detection. In one embodiment, the IR camera comprises optics for focusing a percentage of light reflected from an object onto an array of detectors such that the reflected light can be spatially resolved to form an infrared image, the detectors sampling radiation emitted by at least one light source and recording intensity values for multiple pixels locations along a two dimensional grid. In various embodiments, the array can comprise Mercury Cadmium Telluride (HgCdTe) detectors, Indium Arsenide (InAs), Indium Gallium Arsenide (InGaAs) detectors, Indium Antimonide (InSb) detectors, or Lead Sulphide (PbS) detectors. A first filter has a transmittance peaked in the range of 1000 nm to 1150 nm. A second filter has a transmittance peaked in the range of 1400 nm to 1500 nm. A third filter has a transmittance peaked in the range of 1550 nm to 1650 nm. The filters can be a geometrically patterned array, or can comprise any of: a thin film filter for simultaneous multi-image capture of different spectral bands with a mosaic pattern between filters, a Fabry-Perot filter for simultaneous multi-image capture of different spectral bands, or a filter wheel for non-simultaneous multi-image capture of different spectral bands. The camera further has a plurality of outputs for outputting at least one reflectance value per channel, a processor for processing reflectances associated with pixels in the image, a storage device, and a controller for enabling the selection of the detectors.

What is also disclosed is an infrared camera with a first, second, third and fourth filter. This IR camera is similarly configured to the 3-filter IR camera but further comprises a fourth filter with a transmittance peaked in the range of 1150 nm to 1400 nm.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
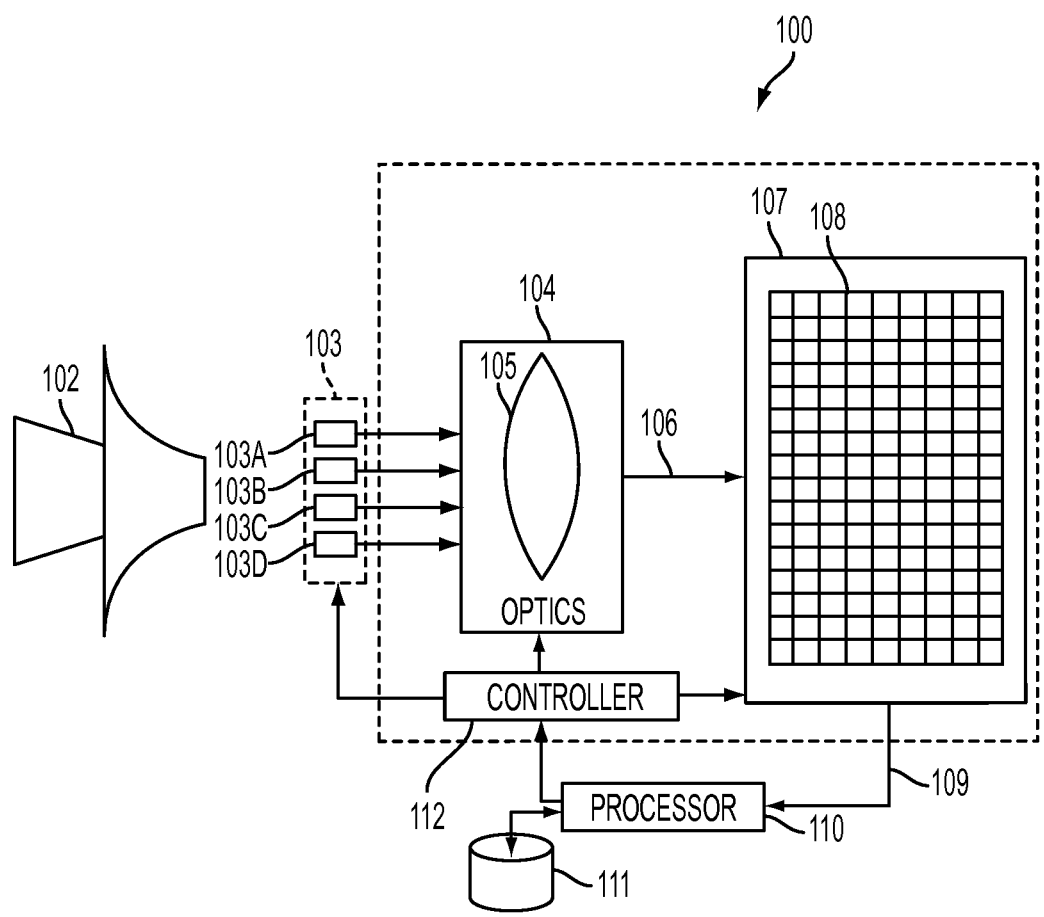
FIG. 1 illustrates one embodiment of an IR camera with four filters.

What is disclosed is a system and method for selecting a wavelength band combination for a multi-band infrared camera system which is optimized for skin detection.

NON-LIMITING DEFINITIONS

An "infrared image" is an IR image captured of a subject of interest using the multi-band IR camera system disclosed herein. A fully-populated infrared image consists of a plurality of pixels with each pixel having an associated IR band vector comprising a total of N intensity values measured in terms of captured reflectances centered about each of N wavelength bands, where N=3 or N=4. Pixels in the captured images contain spectral information. Images captured by a hyper-spectral camera have contiguous spectral planes, whereas multi-spectral images have non-contiguous spectral planes. Hyper-spectral images are processed into a hyper-spectral image data cube comprising a 3D matrix constructed of a combination of 2D image data and 1D spectral data. The infrared image may comprise a time varying video signal.

A "multi-band IR camera system" can be either a multi-spectral or a hyper-spectral apparatus. Both embodiments generally comprise an array of detectors which capture IR light reflected from a target and outputs an infrared image of the target. As disclosed herein, the IR camera system has at least one light source for illuminating the target object and a detector array with each detector having a respective narrow band-pass filter. The spatial resolution of the camera refers to the number of pixels in the image captured by the camera. A higher spatial resolution means a higher density of pixels. The spectral resolution of the camera refers to the camera's ability to resolve features in the electromagnetic spectrum and is usually denoted by $\Delta\lambda$, (often referred to as the resolving power of the device), defined as:

$$R = \frac{\lambda}{\Delta\lambda},$$

where $\Delta\lambda$ is the smallest difference in wavelengths that can be distinguished at wavelength $\lambda$. In different embodiments, the IR cameras disclosed herein include a plurality of outputs for outputting reflectance values on a per-channel basis, and may further comprise a processor and a storage device for processing and storing reflectance values.

A "filter", as used herein, effectuates the transmittance of a desired wavelength band while rejecting wavelengths outside the band such that the light received by the optics of the imaging device is restricted to the bands of interest. The filters can be a thin film filter for simultaneous multi-image capture of different spectral bands with a mosaic pattern between filters. A thin film filter is a coating which is applied to the optics during the optical fabrication process. Thin film coatings can be, for example, Calcium Fluoride ($CaF_2$), Barium Fluoride ($BaF_2$), Zinc Selenide (ZnSe), Zinc Sulfide (ZnS), to name a few. Thin film filters are readily available in various streams of commerce. For example, the Reynard Corporation has experience working with a wide array of thin film coatings for infrared applications including infrared materials supplied by their customers. The filters can be a Fabry-Perot filter for simultaneous multi-image capture of different spectral bands. Embodiments of Fabry-Perot filters are disclosed in the above-incorporated references: U.S. Pat. No. 7,355,714 entitled: "Reconfigurable MEMS Fabry-Perot Tunable Matrix Filter Systems And Methods", U.S. Pat. No. 7,385,704 entitled: "Two-Dimensional Spectral Cameras And Methods For Capturing Spectral Information Using Two-Dimensional Spectral Cameras", and U.S. Pat. No. 7,417,746 entitled: "Fabry-Perot Tunable Filter Systems And Methods". The filters can be a filter wheel for non-simultaneous multi-image capture of different spectral bands. A filter wheel is a wheel assembly of different infrared filters which is rotatably mounted onto the infrared camera system to effectuate non-simultaneous multi-image capture of different spectral bands. The filter wheel is usually manually rotated but, in different configurations, can be made electro-mechanically rotatable. Filter wheels comprising customer provided filters are readily available in various streams of commerce.

An "array of detectors" refers to sensors arranged in a two dimensional grid which sample radiation emitted by the illumination source and record intensity values at pixels locations along the grid. The detector array functions to spatially resolve the received reflectances to form an image and output the image to either a processor or a memory or storage device. The sensitivities of the sensors in the detector array can be made selectable (i.e., tunable) using a controller. In various embodiments, the detector comprises an array of Mercury Cadmium Telluride (HgCdTe) sensors, Indium Arsenide (InAs) sensors, Indium Gallium Arsenide (InGaAs) sensors, Indium Antimonide (InSb) sensors, and/or Lead Sulphide (PbS) sensors. It should be appreciated that the list of sensors is not exhaustive and thus is not to be viewed as limiting. Other sensors which are in existence or which may be developed are intended to fall with the scope of the appended claims.

"Optics" focus a percentage of the illuminator's reflected light onto the detector array. Optics and detectors include components commonly found in commerce.

A "pixel classification algorithm" or "Classifier" is a method for classifying a pixel in an infrared image such that objects in the image can be identified as belonging to a known material such as skin and non-skin. Pixels in an infrared image can be classified using many known techniques, including a correlation method, a best fitting reflectance method, and a ratio method.

A "Correlation Method" refers to a method of pixel classification wherein pixels of an IR image are classified based upon an amount of correlation between a captured intensity of that pixel and a (scaled) intensity calculated from a model. The correlation method using a materials spectra database containing pre-measured reflectances of known materials. A theoretical pixel intensity for each object in the image is calculated and the measured intensity of each pixel is compared to the theoretical intensities to determine the amount of correlation therebetween. In one embodiment, when taking a multiband image, the image intensity is given by:

$$I_c(i) = \alpha \int_{\lambda_1}^{\lambda_2} I_s(\lambda) T_G^2(\lambda) F_i(\lambda) R_o(\lambda) D(\lambda) d\lambda \quad (1)$$

where i=1, 2 ... N stands for the IR band using the $i^{th}$ filter $F_i(\lambda)$, $I_s(\lambda)$ is the power spectrum of the illuminator, $R_o(\lambda)$ is the reflectance of the object inside the vehicle, either a human or a background subject, $T_G(\lambda)$ is the transmittance of a glass window, $D(\lambda)$ is the quantum efficiency of the camera detector, $\lambda_1$ and $\lambda_2$ specifies the wavelength range the camera integrates, and $\alpha$ is a constant that depends on the angle and distance from the illumination source, the pixel's size, and the camera's integration time. In principle, this constant can be calculated but, due to many factors that cannot be determined accurately, it can be treated as a parameter. For the correlation method, this constant is cancelled.

The correlation method is used in conjunction with a database that contains pre-measured reflectance from human skins (hairs) or other objects, the transmittance of window glasses (side window or windshield), the power spectra of the illuminators, the filter transmittances, and the quantum efficiency curve of the detector. The theoretical camera intensity can then be calculated from Eq. (1) and the actual captured camera intensity for each pixel can be compared against the theoretical intensity. The coefficient is given by:

$$C = \frac{\sum_{i=1}^{i=N} [I_{cm}(i)][I_{cs}(i)]}{\sqrt{\sum_{i=1}^{i=N} [I_{cm}(i)]^2} \sqrt{\sum_{i=1}^{i=N} [I_{cs}(i)]^2}}, \quad (2)$$

where $I_{cm}(i)$ is the captured intensity of a pixel from the $i^{th}$ wavelength band, $I_{cs}(i)$ is the intensity of a pixel of the human tissue of the driver, and N is the total number of wavelength bands of the multi-band IR imaging system. If the intensity of the driver's facial pixel (with a particular reflectance) agrees with the measured intensity of the pixel of the object, then the correlation will be high (close to 1). Otherwise, the correlation will be low (close to 0 or negative). Pixels are classified based upon a comparison with a threshold.

A "Best Fitting Reflectance Method" is a pixel classification method which cross-references measured pixel reflectances with reflectances of known materials in a materials spectral database and determines a best fitting reflectance, i.e., a best match.

A "Ratio Method" is a pixel classification method classifies a pixel as human tissue vs. other materials if this ratio is larger or smaller than a threshold value.

An "objective function" is used to measure classifier performance for each combination of wavelength bands. The optimum band combination is chosen that maximizes the objective function. In one embodiment, the objective function is given by:

$$J = D_{skin} - D_{non-skin},$$

where, for a given pixel classification method, $D_{skin}$ is a ratio of the number of correctly classified skin pixels to the total number of skin pixels in the image, and $D_{non-skin}$ is a ratio of the number of non-skin pixels that have been incorrectly classified as skin pixels to the total number of non-skin pixels in the image.

Example IR Camera with Four Filters

Reference is now being made to FIG. 1 which illustrates one embodiment of an IR camera 100 with four filters in accordance with the teachings hereof. Although the embodiment of FIG. 1 is shown having four filters, the illustration equally applies to an embodiment of an IR camera with three filters in accordance with the teachings hereof.

In FIG. 1, reflected light 102 passes through an array of filters (collectively at 103) shown, in this embodiment, comprising four filters 103A-D. Filter 103A has a transmittance in the range of 1000 nm to 1150 nm; filter 103B has a transmittance in the range of 1400 nm to 1500 nm; filter 103C has a transmittance in the range of 1550 nm to 1650 nm; and filter 103D has a transmittance in the range of 1150 nm to 1400 nm. Optics 104 has lens 105 that focus the received light 106 onto detector array 107 shown comprising an array of sensors 108 arranged in a two dimensional grid. It should be appreciated that array 108 is illustrative. Sensors 108 record intensity values at multiple pixels locations. Detector array 107 sends the acquired spectral data comprising the IR image 109 to processor 110 for processing and to memory 111. Controller 112 is shown effectuating the control of any of: the filter array 103, the optics 104, and/or the detector array 107. Although controller 112 is shown integral to the IR camera, it may be external to the device. Processor 110 and memory 111 may be in communication with a computing device (not shown) such as a desktop computer (410 of FIG. 4) or a special purposes computing system such as an ASIC. Any of the components of IR camera 100 may be placed in communication with one or more remote devices over a network.

Flow Diagram of One Embodiment of the Present Method

Figure 2:
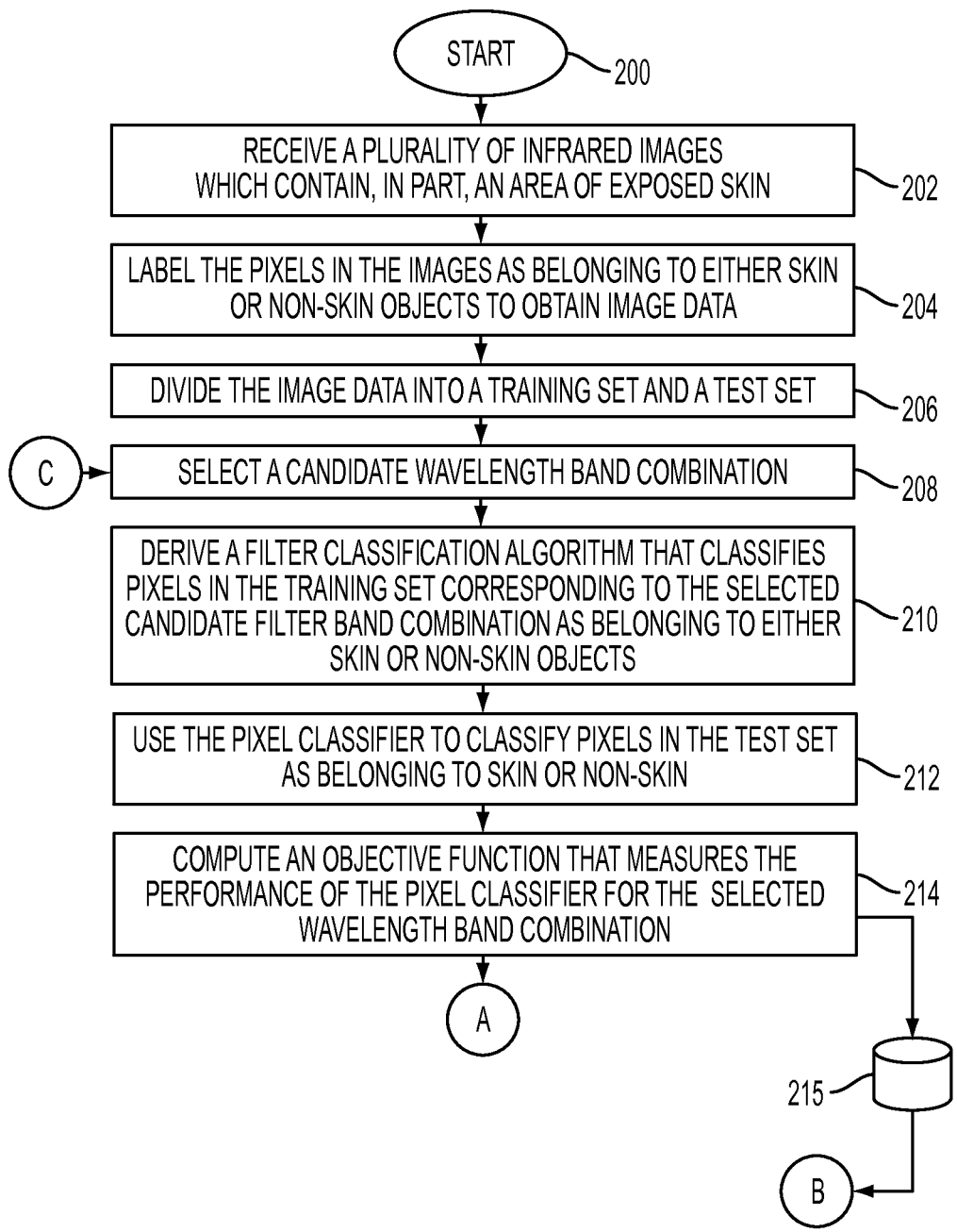
FIG. 2 illustrates one embodiment of the present method for determining a combination of bands for filters of an infrared (IR) camera used for acquiring IR images of humans in a motor vehicle, in accordance with the teachings hereof.

Reference is now being made to the flow diagram of FIG. 2 which illustrates one embodiment of the present method for determining a combination of bands for filters of an infrared (IR) camera used for acquiring IR images of skin. Flow processing begins at step 200 and immediately proceeds to step 202.

At step 202, a plurality of infrared images are received. Each of the images contains, at least in part, an area of exposed skin. The infrared images can be retrieved directly from the IR imaging system used to acquire the images or retrieved from a memory or storage device for processing. The images may be acquired from a remote device over a network. The user may select a portion of the images for processing.

At step 204, label the pixels in the images as belonging to either skin or non-skin objects. The labeled pixels being referred to as "image data".

At step 206, divide the image data into a training set and a test set.

At step 208, select a candidate set of wavelength bands ("filter bands").

At step 210, derive a pixel classification algorithm (a "classifier") that classifies pixel values in the training set corresponding to the selected candidate wavelength band combination as belonging to either skin or non-skin objects.

At step 212, use the classifier to classify pixels in the test set as belonging to skin or non-skin.

At step 214, compute an objective function that measures the performance of the pixel classifier on the test data set for this wavelength band combination. The values calculated for this particular wavelength band combination are saved to storage device 215.

Figure 3:
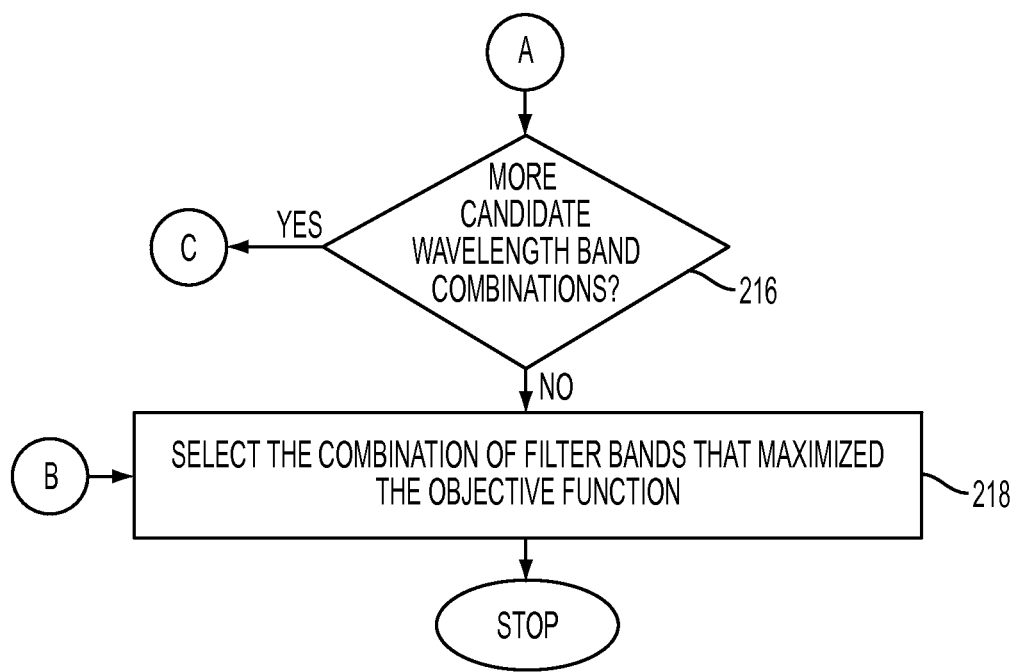
FIG. 3 is a continuation of the flow diagram of FIG. 2 with flow processing continuing with respect to node A.

Reference is now being made to the flow diagram of FIG. 3 which is a continuation of the flow diagram of FIG. 2 with flow processing continuing with respect to node A.

At step 216, a determination is made whether more candidate wavelength band combinations remain to be selected. If so, then processing continues with respect to node C wherein, at step 208, a next wavelength band combination is selected. A pixel classification algorithm is derived for that classifies pixel values in the training set corresponding to this next selected candidate set of filter bands as belonging to either skin or non-skin objects. The pixel classification algorithm is used to classify pixels in this test set as belonging to skin or non-skin. An objective function is computed that measures the performance of the pixel classifier on the test data set for this candidate wavelength band combination. The values of the objective function are saved to storage device 215. The process repeats in such a manner until all desired candidate filter band combinations have been processed.

At step 218, select a combination of filter bands that maximized the objective function. Thereafter, in this particular embodiment, further processing stops.

It should be appreciated that the flow diagrams hereof are illustrative. One or more of the operative steps illustrated in the flow diagram may be performed in a differing order. Other operations, for example, may be added, modified, enhanced, condensed, integrated, or consolidated. Such variations are intended to fall within the scope of the appended claims. All or portions of the flow diagrams may be implemented partially or fully in hardware in conjunction with machine executable instructions.

Block Diagram of Example System

Figure 4:
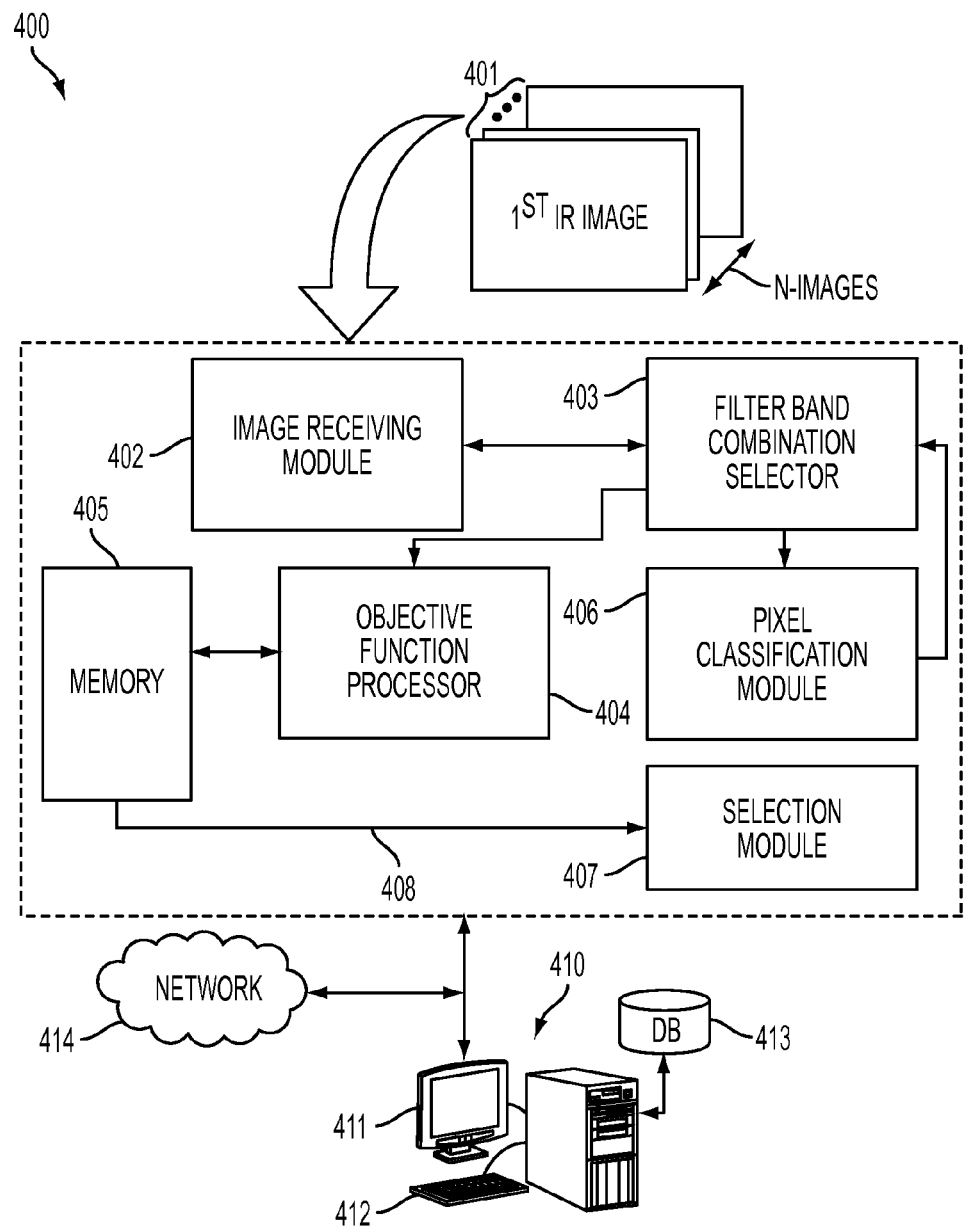
FIG. 4 illustrates a block diagram of one example networked computing system for implementing various aspects of the present method as shown and described with respect to the flow diagrams of FIGS. 2 and 3.
Figure 5:
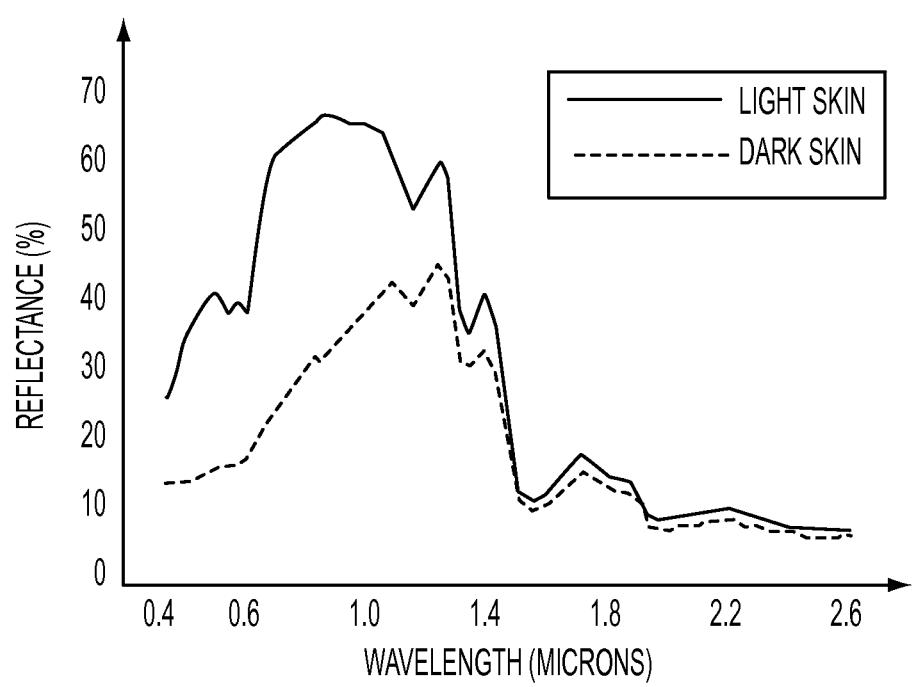
FIG. 5 is a graph which plots human reflectance in the NIR range.

Reference is now being made to FIG. 4 which illustrates a block diagram of one example system capable of implementing various aspects of the present method shown and described with respect to the flow diagrams of FIGS. 2 and 3.

The system 400 of FIG. 4 is shown comprising an image receiving module 402 which receives infrared images 401 containing an area of exposed skin. Receiving module 402 buffers the images, labels the pixels in the images as belonging to skin or non-skin objects, and divides the image data into a training set and a test set. Filter Band Combination Selector 403 selects a wavelength band combination for processing. Candidate sets of filter bands are alternatively selected by a user using, for example, the graphical user interface of workstation 410. Selector 403 receives the image data and passes the training and test data sets to Pixel Classification Module 406 which derives a classifier that classifies pixel values in the training set corresponding to the selected candidate filter band combination as belonging to either skin or non-skin. Module 406 further classifies pixels in the test set as belonging to skin or non-skin. Objective Function Processor 404 calculates the objective function value for each wavelength combination based upon the pixel-classified images. The object function measures the performance of the pixel classifier for the selected filter band combination. The values of the objective function calculated for each filter band combination are stored to Memory 405. Processing repeats for each filter band combination. Selection Module 407 identifies, from Memory 405, the filter band combination that maximized the objective function. The selected filter band combination is communicated to workstation 410.

Workstation 410 is shown comprising a display 411 for enabling a display of information for a user input and a keyboard 412 for making a user selection such as, for example, the user selecting the pixel classification parameters or identifying areas in any of the received images for processing. A user may use the graphical user interface to identify or select one or more portions of the IR image such as, for instance, a facial area where exposed skin is likely to be found in the images. Various portions of the received images intended to be processed in accordance with the teachings hereof, may be stored in a storage device 413 or communicated to a remote device for storage or further processing over network 414 via a communications interface (not shown). It should be understood that any of the modules and processing units of FIG. 4 are in communication with workstation 410 via pathways (shown and not shown) and may further be in communication with one or more devices over network 414. It should be appreciated that some or all of the functionality for any of the modules of system 400 may be performed, in whole or in part, by components internal to workstation 410 or by a special purpose computer system. It should also be appreciated that various modules may designate one or more components which may, in turn, comprise software and/or hardware designed to perform the intended function. A plurality of modules may collectively perform a single function. Each module may have a specialized processor capable of executing machine readable program instructions. A module may comprise a single piece of hardware such as an ASIC, electronic circuit, or special purpose processor. A plurality of modules may be executed by either a single special purpose computer system or a plurality of special purpose computer systems operating in parallel. Connections between modules include both physical and logical connections. Modules may further include one or more software/hardware modules which may further comprise an operating system, drivers, device controllers, and other apparatuses some or all of which may be connected via a network. It is also contemplated that one or more aspects of the present method may be implemented on a dedicated computer system and may also be practiced in distributed computing environments where tasks are performed by remote devices that are linked through a network.

Other Embodiments

The above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof can be implemented as a routine embedded on a personal computer or as a resource residing on a server or workstation, such as a routine embedded in a plug-in, a driver, or the like. The teachings hereof may be partially or fully implemented in software using object or object-oriented software development environments that provide portable source code that can be used on a variety of computer, workstation, server, network, or other hardware platforms. One or more of the capabilities hereof can be emulated in a virtual environment as provided by an operating system, specialized programs or leverage off-the-shelf computer graphics software such as that in Windows, Java, or from a server or hardware accelerator. One or more aspects of the methods described herein are intended to be incorporated in an article of manufacture, including one or more computer program products, having computer usable or machine readable media. The article of manufacture may be included on at least one storage device readable by a machine architecture embodying executable program instructions capable of performing the methodology described herein. The article of manufacture may be included as part of a system, an operating system, a plug-in, or may be shipped, sold, leased, or otherwise provided separately either alone or as part of an add-on, update, upgrade, or product suite.

Various of the above-disclosed and other features and functions, or alternatives hereof, may be combined into other systems or applications. Various presently unforeseen or unanticipated alternatives, modifications, variations, or improvements therein may become apparent and/or subsequently made by those skilled in the art which are also intended to be encompassed by the following claims. Accordingly, the embodiments set forth above are considered to be illustrative and not limiting. Various changes to the above-described embodiments may be made without departing from the spirit and scope of the invention. The teachings of any printed publications including patents and patent applications, are each separately hereby incorporated by reference in their entirety.

What is claimed is:

1. An infrared (IR) camera for acquiring infrared images of skin, the IR camera comprising:
   optics for focusing a percentage of light reflected from an object onto an array of detectors such that said reflected light can be spatially resolved to form an infrared image, said detectors sampling radiation emitted by at least one light source and recording intensity values for multiple pixels locations along a two dimensional grid;
   a first filter with a transmittance peaked in the range of 1000 nm to 1150 nm;
   a second filter with a transmittance peaked in the range of 1400 nm to 1500 nm; and
   a third filter with a transmittance peaked in the range of 1550 nm to 1650 nm.

2. The IR camera of claim 1, wherein said detector array comprises any combination of: Mercury Cadmium Telluride (HgCdTe) sensors, Indium Arsenide (InAs) sensors, Indium Gallium Arsenide (InGaAs) sensors, Indium Antimonide (InSb) sensors, and Lead Sulphide (PbS) sensors.

3. The IR camera of claim 1, further comprising a fourth filter with a transmittance peaked in the range of 1150 nm to 1400 nm.

4. The IR camera of claim 1, wherein said filters comprise a geometrically patterned array.

5. The IR camera of claim 1, wherein said filters comprises any of: a thin film filter for simultaneous multi-image capture of different spectral bands with a mosaic pattern between filters, a Fabry-Perot filter for simultaneous multi-image capture of different spectral bands, and a filter wheel for non-simultaneous multi-image capture of different spectral bands.

6. The IR camera of claim 1, further comprising a plurality of outputs for outputting at least one reflectance value per channel.

7. The IR camera of claim 1, further comprising a processor and a storage device for processing and storing reflectances associated with pixels in said image.

8. The IR camera of claim 1, wherein said detectors are selectable through a controller.

9. The IR camera of claim 1, wherein said light source comprises an array of light emitting diodes (LEDs) with each of said diodes emitting radiation at one of said wavelength ranges.

10. The IR camera of claim 1, wherein said reflected light comprises a time varying source video signal.

11. The IR camera of claim 1, wherein said objects comprise skin blobs of human skin.

12. The IR camera of claim 1, wherein said images are of human occupants in a motor vehicle.

13. The IR camera of claim 1, wherein determining said wavelength band combination of said first, second, and third filters comprises:
   receiving at least one infrared image capturing, in part, an area of exposed skin;
   splitting the image data into a training set and a test set;
   repeating for each candidate filter band combination:
      deriving a classifier for pixels in said filter bands based on pixel data in said training set;
      using said classifier to classify each pixel in said test set as being skin or non-skin; and
      computing an objective function to measure a performance of said classifier; and
   selecting a filter band combination which maximizes said objective function.

14. The IR camera of claim 13, wherein said objective function comprises:

$$J=D_{skin}-D_{non\text{-}skin}$$

where $D_{skin}$ is a ratio of a number of correctly classified skin pixels to the total number of skin pixels in the image, and $D_{non\text{-}skin}$ is a ratio of a number of non-skin pixels that have been incorrectly classified as skin pixels to a total number of non-skin pixels in said image.

15. A method for determining a combination of bands for filters of an infrared (IR) camera used for acquiring IR images of skin, the method comprising:
   receiving at least one infrared image capturing, in part, an area of exposed skin;
   splitting the image data into a training set and a test set;
   repeating for each candidate filter band combination:
      deriving a classifier for pixels in said filter bands based on pixel data in said training set;
      using said classifier to classify each pixel in said test set as being skin or non-skin; and
      computing an objective function to measure a performance of said classifier; and
   selecting a filter band combination which maximizes said objective function.

16. The method of claim 15, wherein said objective function comprises:

$$J=D_{skin}-D_{non\text{-}skin}$$

where $D_{skin}$ is a ratio of a number of correctly classified skin pixels to the total number of skin pixels in the image, and $D_{non\text{-}skin}$ is a ratio of a number of non-skin pixels that have been incorrectly classified as skin pixels to a total number of non-skin pixels in said image.

* * * * *